INVENTOR
John L. Aker

United States Patent Office 3,546,697
Patented Dec. 8, 1970

3,546,697
METHOD AND APPARATUS FOR INTER-POLATING DME INFORMATION
John L. Aker, Olathe, Kans., assignor to King Radio Corporation, Olathe, Kans., a corporation of Kansas
Original application Aug. 24, 1966, Ser. No. 574,701, now Patent No. 3,412,400, dated Nov. 19, 1968. Divided and this application Aug. 26, 1968, Ser. No. 755,415
Int. Cl. G01s 9/14
U.S. Cl. 343—7.3                    5 Claims

ABSTRACT OF THE DISCLOSURE

A method and apparatus for interpolating distance and/or ground speed in distance measuring equipment (DME) when the Returns signal from a ground station is lost during the track mode of operation. The circuitry for accomplishing same includes the necessary elements for producing and maintaining continuous DME information even though the Returns are momentarily lost and the method comprises the steps of producing an electrical signal representative of the time duration between the instant of transmission of an interrogation pulse and the reception of a Return from the ground station, producing an interpolation signal which is usable in the event the Returns are lost, and causing said representative signal to be changeable by said interpolation signal when no Returns are received over a predetermined time period.

BACKGROUND AND BRIEF DESCRIPTION OF THE INVENTION

Figure 1:
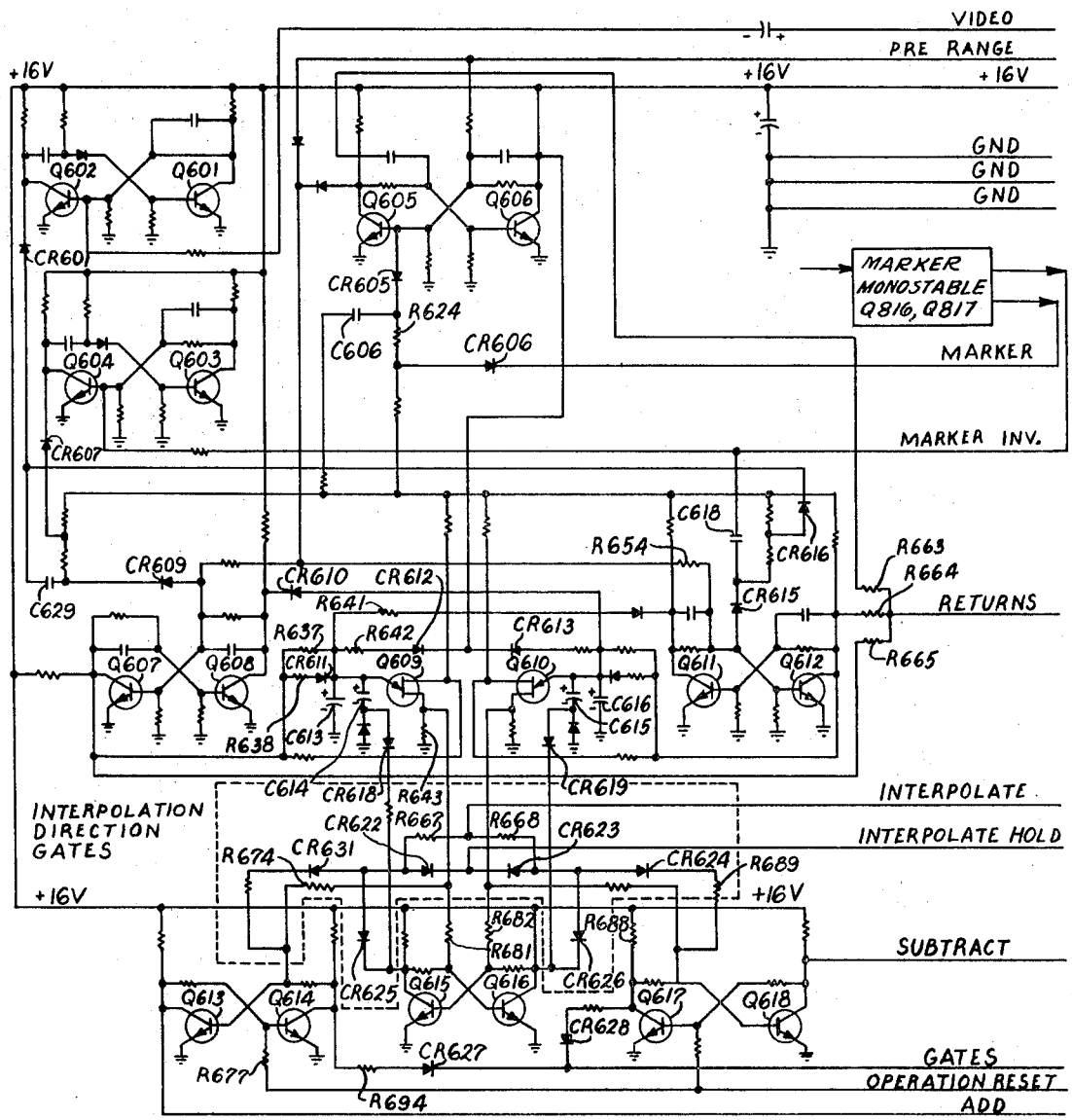

This is a division of my application, entitled "Method and Apparatus for Digitally Measuring Distance," Ser. No. 574,701, filed Aug. 24, 1966 now Pat. No. 3,412,400, issued on Nov. 19, 1968. The invention disclosed herein is also operable with the DME indicator which is the subject of my copending patent application, entitled "Indicator for Distance Measuring Equipment," Ser. No. 575,161, filed Aug. 25, 1966.

The subject interpolation method and circuit has utility with various types of DMEs, however, I have disclosed same in conjunction with the DME described in my patent application Ser. No. 574,701. As suggested in this patent application, the interpolate feature is operable to provide a continuous and an uninterrupted display of distance and/or time to station information even though the Returns from the ground station may be momentarily lost due to blockage of line of sight radio path or ground station identification. More particularly, the subject interpolate method and apparatus disclosed herein is quite valuable when used in conjunction with digital readout DMEs having high resolution displays such as $\frac{1}{10}$ or $\frac{1}{100}$ of a mile. Without interpolation, a momentary loss of signal results in a nonresponsive stationary display for as long as the reply information is not available. A static or stationary display may lack a continuity as it does not take into consideration the velocity or rate of change being experienced by the DME at the moment returns are lost. As a result, it is very possible that the DME-carrying aircraft could move out of the range gate during the time that returns are lost and therefore require a new search.

I have designed an interpolate circuit which has available interpolate pulses but which may not use same until the Returns from the ground station have been lost. The circuit further includes a means for remembering the direction that the airborne DME is traveling relative to the interrogated ground station and utilizes a gate circuit, normally disabled, to apply the interpolate pulses for continuous information absent ground station returns. These interpolate pulses are a function of the rate of change of distance as dictated by the last received returns thereby preserving the display continuity.

An object of the invention is to provide a unique method and apparatus for rendering high resolution readout DMEs more useful and functional and for maintaining the continuity of distance and/or time to station information obtainable therefrom.

Another object of the invention is to provide a unique method and apparatus for maintaining a continuous display of distance and indicated distance change, either to or from a ground station, even though Returns from the ground station transponder may be momentarily lost.

A further object of the invention is to provide a unique interpolation circuit means in a DME which insures a continuous display of distance information when ground station returns are momentarily lost and which remembers and/or stores the rate and direction that the DME was traveling immediately prior to loss of the ground station Returns signal.

Other and further objects of the invention, together with the features of novelty appurtenant thereto, will appear in the course of the following description.

DETAILED DESCRIPTION OF THE INVENTION

Figure 2:
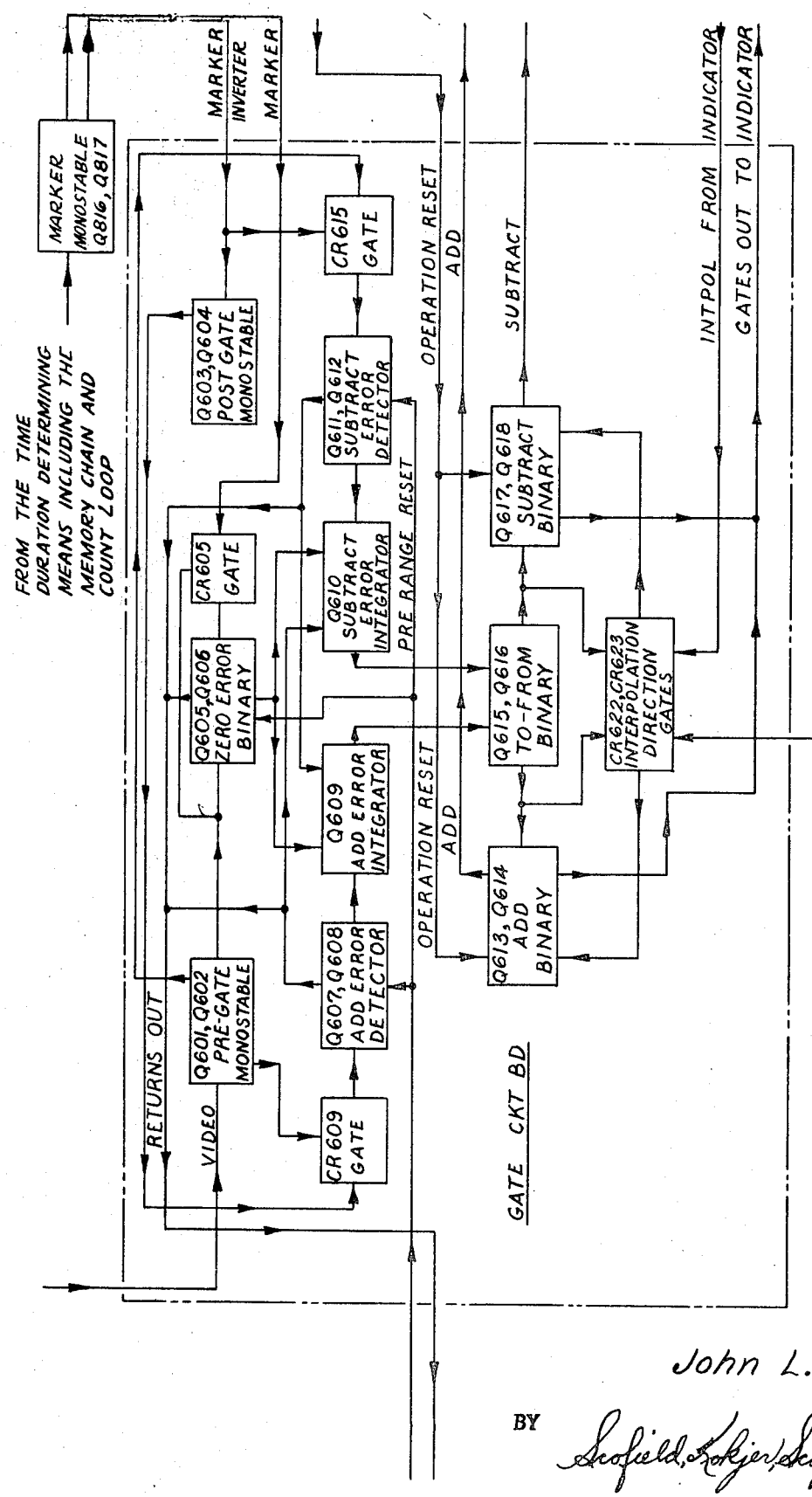

In the accompanying drawings which form a part of the specification and are to be read in conjunction therewith, and in which like reference numerals indicate like parts in the various views;

FIG. 1 is a schematic diagram of the gate circuit board showing the interpolation direction gates and other circuit means for providing the interpolation functions; and FIG. 2 is a block diagram of the gate circuit board shown in FIG. 1.

Turning now more particularly to an operative embodiment of my invention, the gate board of the DME in the above-mentioned patent application was disclosed as FIG. 23 and has been essentially reproduced as FIG. 1. During the operation of the interpolate circuit, the DME will be in track mode and tracking the station as will be disclosed, infra. Once the unit has locked onto the reply pulse, the assumed or stored distance (depending on the type of DME) generates a time delay which corresponds to the time delay of the round trip radio wave.

It is, therefore necessary to generate a time delay which is proportional to the assumed or stored distance and to compare this time delay with the actual time delay of the round trip system radio delay.

At each interrogation of the ground station by the airborne unit, the airborne unit converts a stored number into a time delay. The end of this time delay being denoted as the Marker Event. The Marker Event compared by the gate board against the returned video (representation of the received radio wave from the ground station) from the IF amplifier. As the aircraft moves with respect to the ground station, the time delay between the interrogation and reception of a reply changes so that the stored number and assumed time delay must be modified in order to place the two in time (distance)

agreement. When this is done, the stored number that produced the assumed time delay then is correct.

The time comparison mentioned above is made on the gate board by three decisions called error conditions. These three error conditions are as follows: (1) the Marker preceding the return by up to 15 microseconds, (2) the Marker in coincidence with the return; and (3) the Marker following the return by up to 15 microseconds. All time differences in excess of 15 microseconds are ignored as they are arbitrarily not considered to be valid replies.

In the case of the first error condition, that is the Marker preceding the video reply, a pulse on the Marker inverted pulse line shown on FIG. 1 (this event is the logical complement of the Marker pulse and has the same time relationship as the Marker pulse), triggers the post gate monostable Q603, Q604. This pulse gate monostable is active for 15 microseconds, and during the time it is active it enables the CR609 diode gate so that if a video pulse is received while this gate is active, it will be passed by the gate to the Add Error detector Q607, Q608. Each time the Add Error detector is triggered, a charge is accumulated in the Add Error integrator (Q609 and related circuitry). (It is necessary to integrate and accumulate these errors due to the fact that the reply from the ground station is of a statistical nature and no single reply can validly determine whether it was an answer to subject airborne interrogator, or a random reply or answer to some other DME equipment in the surrounding area.)

If the Add Error condition persists, e.g. with the Marker event preceding the video return, eventually enough charge will be accumulated in the Add Error integrator to trigger same. In such an event, a pulse will pass from the Q609 Add Error integrator into Q615, Q616 (To-From Binary), thereby setting this binary in the outbound or From state. Succeeding add command pulses will not further effect the state of this binary, however, a reversal of direction of the aircraft with respect to the ground station would change the binary's state. If the aircraft would suddenly begin heading toward the station, the DME would begin subtracting its displayed range by means of pulses from the Subtract Error integrator (Q610 and related circuitry). In such a case, the To-From binary would change states to the To state on the first pulse from the Subtract Error integrator.

Assume again that the Add-Error integrator generated its first Add pulse, and delivered same to the Add binary Q613, Q614. The Add binary, when activated, will place a ground on the add line to the Operation Board in the DME. This ground condition will cause an addition operation to be carried out elsewhere in the unit and when carried out, will increase the displayed range and generated time delay of the Memory Chain. Once this addition operation has been carried out, an operation reset command will be generated in the DME (as mentioned in my patent application, supra). This reset pulse will then reset the Add binary, signifying that the addition operation has been carried out.

At the time that the Add binary was triggered, a pulse was directed out the gates line to the indicator. Note that if the Subtract binary had been triggered, a pulse would be available from that binary to flow into the same gates line. The results of this connection is that a pulse is available on the gates line for each $1/10$ mile addition or subtraction of distance. The pulse rate of this gates line then is an indication of the relative velocity of the aircraft with respect to the ground station and is without regard to absolute direction. As a result, the pulse rate is without direction sense and would be identical whether the aircraft was traveling inbound or outbound.

If, during the previously mentioned addition operation, the equipment was properly tracking the ground station, the add operation would bring the internally generated time delay into time coincidence wth the video return time delay. That is to say, a Zero Error condition would now exist until the aircraft has moved a further $1/10$ of a mile away from the station. This Zero Error condition is approximately $1/10$ of a mile wide and creates a time zone where no addition or subtraction operation need be made. (Note the connection from the Zero binary Q605, Q606 to the Add or Subtract Error integrators. This connection serves to discharge an accumulated Add or Subtract Error voltage in the event of a Zero Error detection. The purpose of this is to make further Add or Subtract Error detections necessary in the case of a Zero Error detection.)

The operation of the Operation Board in a Subtract Error condition is very similar to that discussed above with reference to the Add Error condition. In the case of a Subtract Error, the video return precedes the Marker event in time, indicating that the stored distance number is too large and must be reduced to shorten the time of the Marker event to bring the Marker event in time coincidence with the video reply. This function is performed by a triggering of the Pre-Gate Monostable Q601, Q602 by the video return, activating the CR615 diode gate for a period of approximately 15 microseconds. If a Marker event occurs during the 15 microseconds that the CR615 diode gate is enabled, the Marker Inverted event or pulse will be passed through the CR615 diode gate to the Subtract Error detector (Q611, Q612). This Subtract Error detector will begin to accumulate a charge in the Subtract Error integrator (Q610 and related circuitry) in a manner similar to that discussed above with the Add Error operation.

If sufficient subtract errors are detected to trigger over the Subtract Error integrator, the pulse from Q610 (Subtract Error integrator) will pass to the To-From binary (Q615, Q616) and to the Subtract binary (Q617, Q618). A pulse from the Subtract Error integrator will thereby set the To-From binary in the To state and trigger the Subtract binary so that a Subtract command is given to the unit and the pulse also will be going out the Gates line to the indicator.

(Note the interconnection between the Add and Subtract Error integrators so that a subtract error detection will discharge the Add Error integrator and an Add Error detection will discharge the Subtract Error integrator. This is necessary because the detection of a Subtract Error places serious doubts on the validity of any accumulated Add Error charge and vice versa.)

Assume that the unit has been tracking the station in one direction or the other without any interruption. Should an interruption in signal reception occur, a mechanism which maintains continuity of distance change and display is desirable, especially in high resolution systems. In low resolution systems where the distance change is 1 mile increments or more, a momentary loss of returns may not be noticeable on the display as it would be too insignificant a deviation from normal to be observed. However, when resolutions having $1/10$ mile or less ($1/100$) are used in the DME system, it becomes necessary to maintain continuity over the time when the signal is lost as the aircraft can easily travel several tenths (or hundredths) of a mile during this time interval.

As mentioned above, each time a $1/10$ mile change in distance is commanded, a pulse goes out the Gates line to the indicator. This pulse rate is converted into a rate voltage in the indicator, and is proportional to the velocity of the aircraft without regard to the direction of the aircraft. The rate voltage, which is an integrated and smoothed representation of the tracking rate of the aircraft, is then converted back into a pulse rate which is synchronized to the pulse rate from the unit so that it represents the integrated velocity of the aircraft over the past several minutes. This average velocity pulse rate is then made available to the DME unit in the form of interpolate pulses over the interpolate line. These pulses provide the interpolate feature between signal periods during a loss of signal condition in order to maintain continuity of display.

The interpolate hold line shown in FIG. 1 comes from another section of the DME and functions to monitor the ratio of replies to interrogations. As long as this ratio is high, it is assumed that the signal strength is sufficient for the Gates Board to carry out its function without help from interpolation. However, should returns be lost, the interpolate hold line will have positive potential applied thereto, freeing the interpolation direction gate (discussed below) to pass the interpolation pulses from the indicator. As was mentioned, these interpolation pulses are constantly present once the equipment has attained tracking velocity and the velocity voltages have accumulated.

The To-From binary Q615, Q616, determines which direction the Interpolation pulses will go, e.g. to the Add binary or to the Subtract binary, should the interpolate hold condition be cancelled. In such a case, when the interpolate permission is given. the interpolation pulses will be passed in the direction of the last commanded distance change. The direction of the last distance change will be remembered by the To-From binary.

Upon loss of a signal, the DME will continue to interpolate from the last known distance and at the last known rate, until either signals are returned, in which case the interpolate hold will again apply, or until the programed interpolate time elapses, typically 15 seconds. After 15 seconds, the DME assumes that it has lost the ground station and will return to the search mode.

Under normal conditions, the pulse rate to the gates line informs the indicator of the relative velocity of the aircraft with respect to the ground station. At 600 kts., the 1/10 mile rate of change will be 100 per minute. As mentioned above, one type of indicator, usable with the DME, converts this pulse rate into a velocity voltage and then converts this velocity voltage back into a pulse rate. The interpolate pulse is continuously fed to the gate board, but is not normally used. These pulses are synchronized to the gate line pulses so that they appear at approximately the same time and rate as the error commanded additions or subtractions. Should returns momentarily be lost, due to ground station identity or because of some blockage in the line of sight radio path, the interpolation pulses are allowed to be substituted for the pulses from the Error Integrators. This allows the unit to continue tracking in the same direction and at the same rate as it was before the signal was lost thereby maintaining the continuity and distance to display.

Interpolate pulses from the indicator are applied to resistors R667 and R668. The Interpolate hold line is normally at ground potential by command of the Initiation board (Last Return Delay Generator, note my copending application Ser. No. 574,701 now Pat. No 3,412,-400). The Last Return Delay Generator is here operating in a similar fashion as in the search mode, except now the delay is in allowing interpolation, rather than Search Advance. The current through resistors R667 and R668, due to the positive interpolate pulses, is shunted by diodes CR622 and CR623 to ground. If interpolation is called for, the Interpolate hold line will rise to a positive voltage of about 14 volts, back biasing diodes CR622 and CR623. With these diodes now back biased, the interpolate pulse is still shunted to ground by either diode CR625 or CR626, depending on the state of the To-From binary (Q615, Q616).

If the last operation from the Error Integrator was a subtraction, then the To-From binary will be in the "To" condition as Q615 would have been turned on by a pulse from Q610. Diode CR625 will shunt the pulse current from resistor R667 to ground through the "On" transistor Q615. Q616, however, will be cut off and its collector will be at a high positive voltage, back biasing diode CR626. The pulse current from resistor R668 will be allowed to pass through diode CR624 and resistor R689 to the base of Q618, setting the Subtract binary (Q617, Q618). A subtraction operation will thus be carried out by the interpolation pulses in the same manner as if it had been commanded by the Q610 Subtract Error Integrator.

The operation of the interpolate direction gates are substantially similar during the situation when additions are being commanded by the error detectors. Since the above-mentioned gates are symmetrical, the loss of signal during an addition track results in the To-From binary causing the Add binary (Q613, Q614) to be set and the addition operation to be also carried out by the interpolation pulses as if same were commanded by the Q609. Add Error integrator.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations.

Having thus described my invention, I claim:

1. In an improved DME which measures the time duration between the instant of transmission of an interrogation pulse and the reception of a return by the DME, the improvement comprising:
 means operable as a function of the reception of said return for producing a pulse representative of said time duration, said representative pulse producing means including a means for changing the time for production of said representative pulse in accordance with the direction (to or from) that the DME is moving with reference to a ground station,
 means for remembering the direction the DME was traveling at the time of the production of the last representative pulse,
 interpolate means for causing said representative pulse to be produced when no returns are received over a predetermined period of time, said interpolating means operable to maintain the continuity of DME information even though said returns may be momentarily lost, and
 means for operating said interpolate means consistently with said last remembered direction.

2. The invention as in claim 1 wherein said interpolate operating means includes a gate circuit connected to said remembering means, a source of interpolate pulses, said gate circuit operable to gate said interpolate pulses to said representative pulse producing means so that said time duration for producing said representative pulse may be changed absent the reception of said returns.

3. The method of interpolating distance and/or ground speed in a DME when returns from a ground station are lost, said method comprising the steps of:
 producing a pulse representative of the time duration between the instant of transmission of an interrogation pulse and the reception of a return,
 establishing the rate of change of time duration of said first producing step,
 producing a plurality of interpolation pulses which are usable in the event said returns are lost, and
 causing said representative pulse to be produced by said interpolating pulses at the last known rate of change when no returns are received over a predetermined time period, thereby maintaining the continuity of DME information even though the returns are momentarily lost.

4. The invention as in claim 3 including the step of remembering the to or from direction that the DME was traveling relative to said ground station and causing said representative pulse to be produced consistently with said last remembered direction.

5. The method of interpolating distance and/or ground speed in a digitally operated DME when returns from the ground station are lost, said method comprising the steps of:
  producing a digital pulse representative of the time duration between the instant of transmission of an interrogation pulse and the reception of a return,
  establishing a rate of change of time duration of said first producing step,
  producing a plurality of interpolation pulses which are usable in the event said returns are lost, and
  causing said representative pulse to be produced by said interpolation pulses at the last known rate of change when no returns are received over a predetermined time period, thereby maintaining the continuity and relative direction of DME information even though the returns are momentarily lost.

References Cited

UNITED STATES PATENTS

| | | | |
|---|---|---|---|
| 3,054,103 | 9/1962 | de Faymoreau | 343—7.3 |
| 3,246,324 | 4/1966 | Price | 343—7.3 |
| 3,321,757 | 5/1967 | Crow et al. | 343—7.3 |
| 3,354,455 | 11/1967 | Briggs et al. | 343—7.3 |

RODNEY D. BENNETT, Primary Examiner

T. H. TUBBESING, Assistant Examiner